United States Patent [19]
Gebert et al.

[11] Patent Number: 5,298,738
[45] Date of Patent: Mar. 29, 1994

[54] SYSTEM FOR MONITORING VEHICLES HAVING A START AND A STOP PAIR OF BEAMS

[76] Inventors: Ruediger H. Gebert; Carl A. Van Maarseveen, both of P.O. Box 14183, Verwoerdburg, 0140, South Africa

[21] Appl. No.: 940,047
[22] Filed: Sep. 3, 1992
[51] Int. Cl.⁵ ............................................. G01V 9/04
[52] U.S. Cl. ................................. 250/222.1; 340/936; 356/28
[58] Field of Search ............................ 250/222.1, 221; 350/155, 157, 189; 324/175; 340/670, 691, 988, 425, 936; 356/28; 364/913, 917, 936, 562, 565

[56] References Cited
U.S. PATENT DOCUMENTS

| | | | |
|---|---|---|---|
| 2,347,194 | 4/1944 | Holliday | 340/936 |
| 4,247,768 | 1/1981 | Elmer et al. | 250/222.1 |
| 5,066,950 | 11/1991 | Schweitzer et al. | 340/936 |

Primary Examiner—David C. Nelms
Assistant Examiner—Que T. Le
Attorney, Agent, or Firm—Omri M. Behr; Matthew J. McDonald

[57] ABSTRACT

A beam system for traffic monitoring which comprises transmitters for two pairs of beams which constitute a start and a stop pair of beams which in use are spaced from each other by a known distance; receivers for each beam; electronic means connected to detect when reception of the beams by the receivers are interrupted; and means for manipulating data including that derived from the receivers according to desired algorithms, wherein there are provided two pairs of beams, one pair of beams being located at a different level from the other with means for comparing speed or other quantities with the option of rejecting the detection if they do not sufficiently agree.

9 Claims, 9 Drawing Sheets

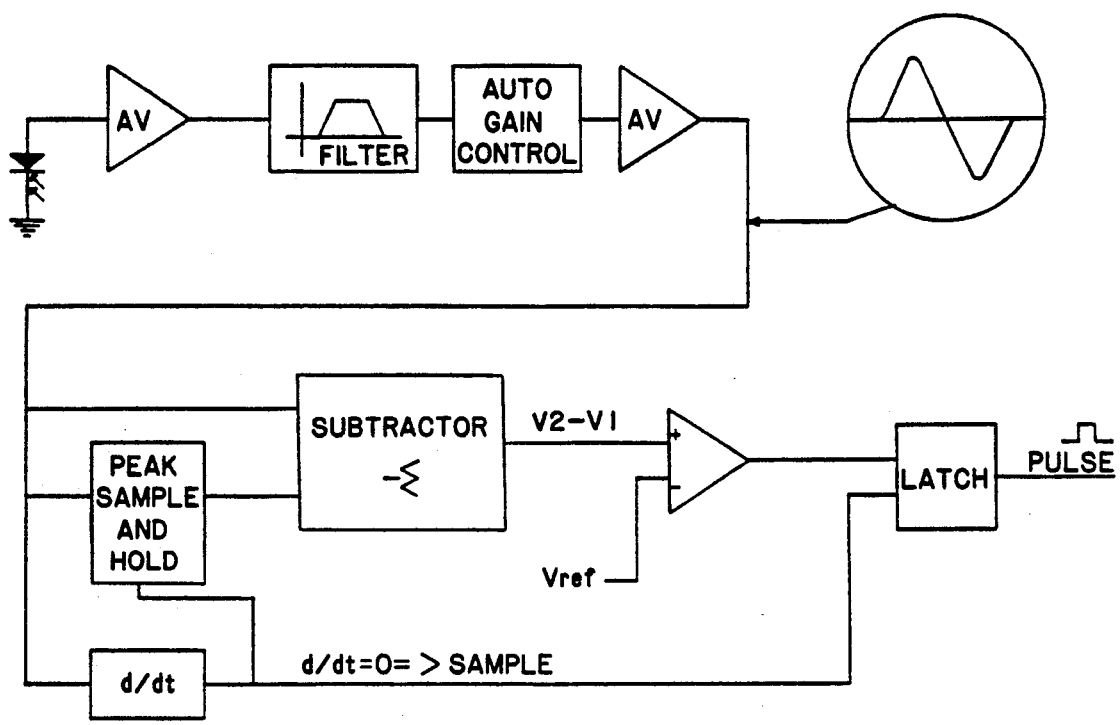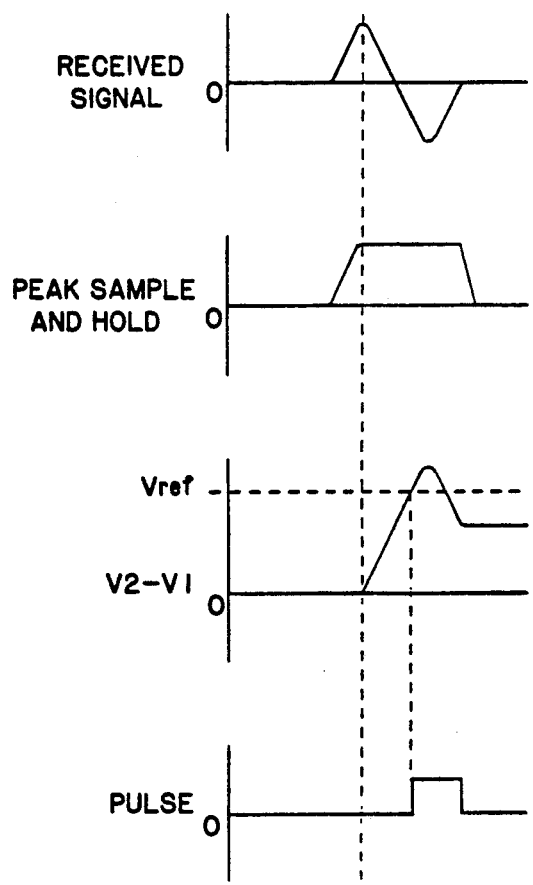
FIG. 10

1. LASER DIODE
2. INTERNAL MONITOR DIODE

SYSTEM FOR MONITORING VEHICLES HAVING A START AND A STOP PAIR OF BEAMS

FIELD OF THE INVENTION

This invention relates to traffic monitoring more particularly to the monitoring of vehicles by means of light beams or other radiations in the electromagnetic spectrum for which the word beams will be used and must be so understood in this specification. Although the invention is primarily applicable to the monitoring of traffic in road vehicles it could be applied in other contexts, for example the movement of aircraft on runways or aircraft carrier flight decks, the movement of waterborne vehicles and other applications. While too it is primarily applicable in connection with speed measurement it may be used in other applications as will become apparent from the description which follows.

PROBLEMS IN THE PRIOR ART

In road traffic monitoring the use of peizo/tribo cables stretched across the road has become well established in competition with other technologies as it provides accurate speed measurement sufficient to satisfy the courts for speed law enforcement purposes and reliable signals for other aspects of traffic monitoring. For example, speed measurements by radar technology involves certain inherent uncertainties and possibilities for error which has militated against its wide adoption.

However, the use of cables has disadvantages including the limited working life span of the cables and the danger to personnel in extending them over a busy highway. In particular the life span is not reliably predictable since it is greatly dependent on the type of vehicles involved, the driving characteristics and the predilection to chance damage, the cables being costly items. Some difficulties are also experienced with the manufacturer of the cables in obtaining peizo electric responses within necessary prescribed limits of specifications.

Light beams projected across the road have also been subject to criticism and are not regarded as generally reliable due to the effects of bouncing of the vehicle and the irregularity of the front end profile of the vehicle and in some examples the difficulty of setting the beams up with their receptors in a manner which is sufficiently accurate and achieves reliable reception of the uninterrupted beam.

THE INVENTION

The present invention provides a beam system for traffic monitoring which comprises transmitters for a pair of beams which constitute a start beam and a stop beam which in use are spaced from each other by a known distance, receivers for each beam, electronic means connected to detect when receptions of the beams by the receivers are interrupted and means for manipulating data including that derived from the receivers according to desired or required algorithms, characterised in that in accordance with the invention there are provided two pairs of beams, each pair of beams having a measuring distance between them, the one pair of beams being located at a different level from the other with means for comparing speed and other detections and measurements made between each pair of beams with each other with the option of rejecting the detection if they do not sufficiently agree.

The invention can be implemented with transmitters at one side of a road and receivers at the other side or with both transmitters and receivers at one side and reflectors at the other side.

The algorithm referred to can be implemented in software and/or hardware, for example by means of field programmable gate arrays and other kinds of hardware processing.

In accordance with a preferred embodiment of the invention the two pairs of beams are not only located at different levels from one another but are also staggered from each other in a horizontal direction by a distance less than the measuring distance together with further means to detect the sequence of interruption of the beams and again provide the possibility of rejecting the detection if an inappropriate sequence as defined is generated.

The use of two pairs of beams at different levels or heights above the road surface, for example, overcomes the problem of vehicle bounce and the irregular front profile of a vehicle because if the two pairs provide identical readings of speed the probability of these being erroneous becomes negligible. The horizontal staggering of the two pairs of beams with respect to each other allows inappropriate sequences of interruption of the four beams to be rejected. For example, if the beams are numbered 1, 2, 3, 4 the appropriate sequence of interruption of the beams for left to right traffic must be 1, 2, 3, 4 and for right to left traffic must be 4, 3, 2, 1. Any other sequence such as 1, 3, 2, 4 or 4, 2, 3, 1, etc., (e.g. due to birds, etc.) can be rejected.

As the acutely sloping front of some modern cars and sports cars can cause large errors in speed reading (proportional to the tangent of the angle of slope off the vertical) which result from the vertical oscillation of the vehicle; the system of staggered beams can be used to reject readings triggered on such sloping edges.

A further preferred feature of this invention is that the beams are uncollimated but the beam receptors have a restricted diameter or transverse dimension while at the same time each of the beams is modulated to give it an identification which can be recognised by the correct receptor opposite it and any other beam ignored. Although in principle modulation, for example, by means of a carrier frequency on the beam suggests itself the inventors have found that a more suitable modulation is to impose a pulse signature to each beam so that each beam is pulsed in a distinctive manner and so that the detectors can discriminate the correct beam which is projected from opposite the detector from the other beams.

It calls to be explained that up to now the perception in the art has been that collimated beams of limited diameter are essential for two reasons. Firstly it must be a narrow collimated beam to get accurately located start signal and stop signal and secondly, even getting past this point, that an uncollimated beam expands in diameter so that it is received by both start and stop receivers which can then not discriminate between interruption of the start beam and the stop beam.

The important advantages which may be drawn from uncollimated approach is thus that first of all the setting up of the beams does not have to be so very accurate since the divergent beams allow a greater margin of directional error while still being reliably picked up by its receptor; the limited diameter of the receptor provides that only that part of the beam which is critical for beam interruption to the receptor is also of restricted diameter and hence of suitable accuracy as start signals and stop signals respectively for speed measurements. Additionally if the beam diameter at the point of leaving the emitter is small (for example a laser) the critical path for beam interruption remains of small diameter. Furthermore the danger of cross beam interference resulting from the divergent character of the beams, that is where a receptor may also receive a beam not from the position opposite but from another beam which is near to it is eliminated because of the signature which identifies the correct beam which is to be registered by the detector, other beams will be ignored. In this way the intractable conflicting requirements of ease of setting up, accuracy of speed measurement and elimination of interference or confusion due to cross over reception of the beams are all satisfied in a highly ingenious way.

The means for comparison of speed measurements made by the two pairs of beams, the means for checking the correct sequence and timing of interruption of beams and the means for generating the modulation to the beams transmitted and the correct discrimination of these beams at the receivers can all be in the form of suitable electronic and/or logic circuitry and/or software.

The beams can be optical beams, that is beams generated in that part of the electro-magnetic spectrum which is visible and the immediate peripheries of the visible spectrum, e.g. infra-red and ultra-violet portions of the spectrum.

Of course, the beams can be used not only to detect speed but also detecting and counting the passage of vehicles, in determining acceleration of vehicles, following distances between vehicles and the like and monitoring must be understood in the widest sense.

In accordance with a further preferred feature of the invention the transmitters for all the beams are provided in a single box or unit and similarly all the receptors in another single box or unit and with this in view, preferably, the box or other carrier is of a conveniently portable size. In this context the commonplace measuring distance of 1,5 meters, for example used with peizo electric cables is preferably not adopted but a shorter distance, for example half that distance, namely 750 mm.

The capacity to distinguish correct sequences of beam interruption allows for the instrument to be used with the beams projected over the full width of a two-directional road and thus measure speed, for example, in both directions. In one direction beams 1 and 2 will be the two start beams and beams 3 and 4 the two stop beams while for traffic in the other direction the beams 3 and 4 become the two start beams and beams 1 and 2 the two stop beams.

Where the beams are pulsed each in a unique way to provide a pulse signature for each beam further validation techniques can be applied, for example, to eliminate any risk that bull-bars in front of a vehicle or other effects such as triggering by moths and birds, etc., which would cause error can be eliminated. Thus after a first pulse of a modulated beam has been interrupted a waiting period can be initiated followed by a validation at the end of the waiting period that the following pulses are still interrupted. This can, for example, validate that the first pulse interruption was indeed by the front end of the vehicle and this is then followed by continuing interruption of the pulses of the beam by the solid body of the vehicle. Where this validation is not satisfied again a reading can be rejected.

If it is desirable to obtain separation of the systems even at the optical level this can be achieved by one pair of beams being polarised horizontally and the other pair of beams being polarised vertically and the receptors adapted to receive only the beam of the appropriate polarisation and ignore the other. Left and right circular polorisation may also be used. Sometimes the probity of the system in law enforcement circumstances requires this degree of total separation of the measurement systems.

The technique or discriminating pulse signals each of which has a particular pulsing signature can include the use of a phase lock loop in which a signal local to the receptor is generated with the same timing as the transmitted signal and so long as the two signals are in perfect match the beam is received as the correct beam and when interrupted the interruption is detected.

The modulation of the beams also eliminates any risk of interference by the light sources such as, for example, reflected ambient light.

BRIEF DESCRIPTION OF THE DRAWINGS

The invention will be more fully described by way of an example with reference to the accompanying drawings in which:

FIGS. 10 to 14 are schematic diagrams describing the system.

DESCRIPTION OF THE PREFERRED EMBODIMENTS

Figure 1:
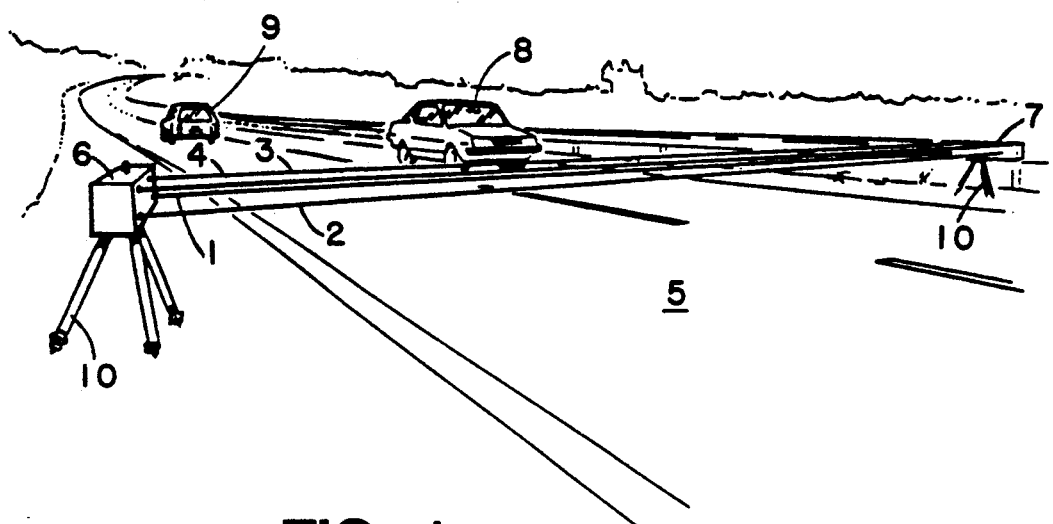
FIG. 1 is a perspective view showing a general arrangement of apparatus in accordance with the invention.

As shown in FIG. 1 the system consists of four optical beams 1, 2, 3 and 4 projected across a roadway 5 by means of a transmitter 7 which is located at one side of the road and received by a receiver 6 located at the other side of the road. Oncoming vehicles 8 and 9 will interrupt the beams providing the data for reliably detecting the passage of the motor vehicles for determination of speed, acceleration, following distance, etc. In this example the beams are shown as set up on one side of a motor way or freeway of two lanes with the vehicles 8 and 9 travelling in the same direction in different lanes but the system as will later be exemplified can also be set up across a two directional road with the vehicles travelling in opposite directions on the two (or four or more) lanes of the road.

Figure 2:
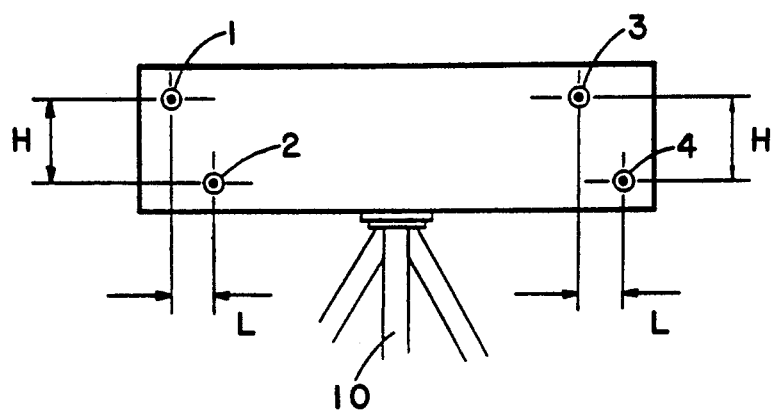
FIG. 2 is an elevation of the transmitter shown in FIG. 1.

As shown also in FIG. 2 the transmitter and receiver are relatively compact boxes 750 mm long containing all four of the transmitters and receivers respectively for the beams, mounted on tripod legs 10. The first pair of beams is created by the transmitters 1 and 3 and the second pair of beams by transmitters 2 and 4 and it will be seen that the first pair of beams is off-set in height or level by distance H for the second pair and similarly the first pair of beams is staggered horizontally with respect to the second pair by a distance L.

Figure 3:
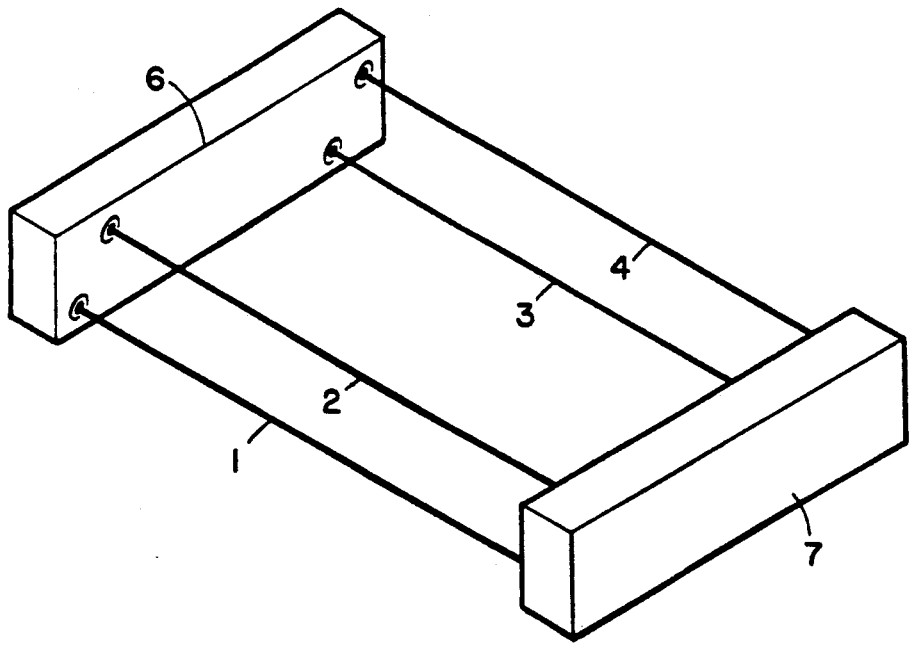
FIG. 3 is an isometric schematic view of the system.

This disposition of the beams is also shown in the view of FIG. 3 schematically.

Figure 2A:
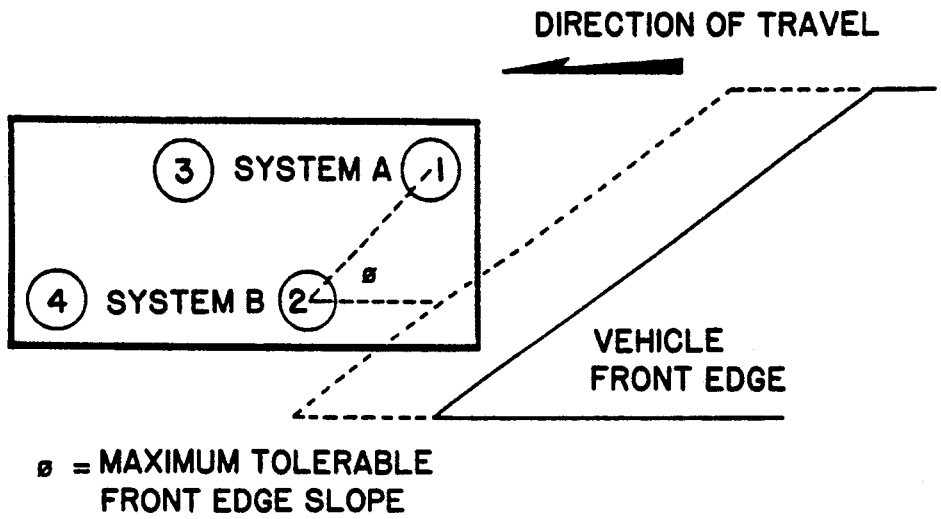
FIG. 2a is an elevation of an alternative transmitter layout.

An adaptation for the modern "wedge shape" of private cars is shown in FIG. 2a. In effect beam 2 has been shifted to be more horizontally separated from the beam 1 to produce a maximum tolerable vehicle front edge slope equal to 0. The beams are all in fact equidistant. It can be seen in FIG. 2a that the beam 2 will be triggered before beam 1 which will cause a sequence fault as described above and the reading will be rejected.

The beams are in the infra-red portion of the spectrum, provided by light emitting diodes (LED's) or IR laser diodes. The receiver 6 is provided with suitable electronic and logic circuitry for processing the interruption of the beams and computing the required information. The beams can be projected, for example over a distance of some 20 to 25 meters, for example at a height of between 500 and 600 mms, as stated the beam spacing between start and stop beams being 750 mm, or the spacing may be less, e.g. 400 mm. The beam diameter which is received by the receivers can, for example be 8 mm, or less than 2 mm and these arrangements can provide an accuracy of, for example, about 2% even at the maximum speed of the instrument, say of measuring 300 kilometers per hour.

The transmitter can be supplied with a laser aiming device which can transmit a spot of light on to the receiver for the purpose of setting up the two instruments and aligning them appropriately. The laser will then be switched off once set up is completed, or an optical LED day/night sight can be used. Pilot LED's can be provided on the back plate or on back and front of the receiver to assist confirmation that the beams are correctly aligned and are being received by the receiver.

It will be appreciated that this system is a dual and independent set of detectors comprising two start beams 1 and 2 and two stop beams 3 and 4 or, for traffic in the opposite direction the start beams being 4 and 3 and the stop beams being 2 and 1.

Figure 5:
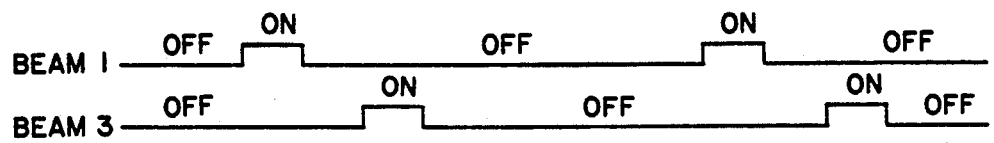
FIGS. 5 to 9 are pulse diagrams showing aspects of the pulsed light signal.

The start and stop beams of each detector pair are guaranteed not to interfere with each other by the use of phase modulation systems in which each beam has a time slot in which it must occur according to a flashing cycle as shown in FIG. 5.

As shown in FIG. 5 the beam 1 flashes in an on/off cycle and the beam 2 flashes in an on/off cycle which is out of phase with beam 1.

Figure 9:
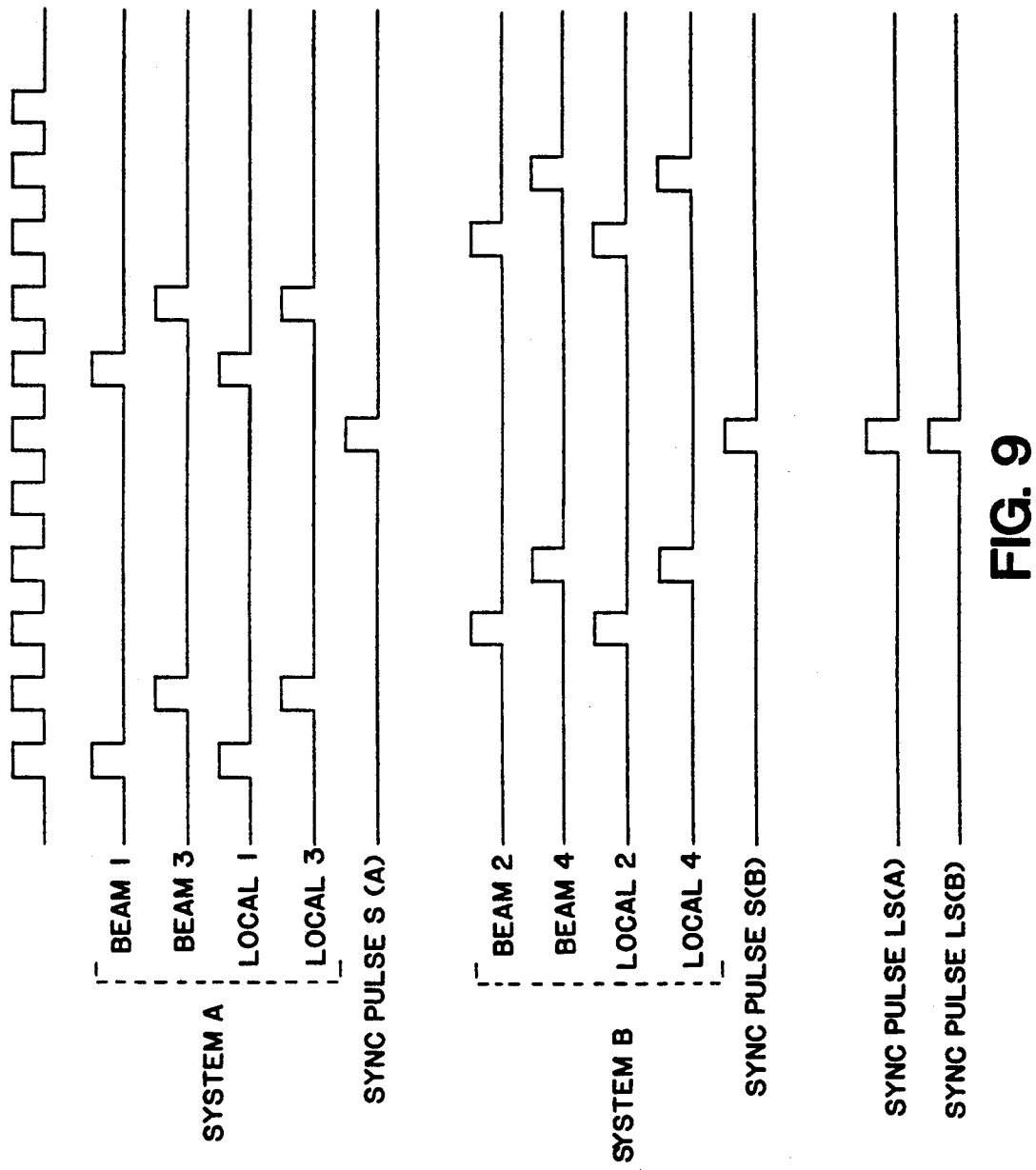

As shown in FIG. 9, similarly a system can be designed that has four unique phases, one for each of the four beams and no optical polarisation beam separators.

All the above arguments and descriptions apply.

In order to achieve separate and independent system operation it is, however, necessary to have the two phase modulated system synchronised. Thus if the system has one transmitter modulator, (if it or part of it fails then the system will cease to work by its very nature) each receiver must still have a phase locked loop which locks onto the correct two pulses of its system.

Each signal recovery system, see FIG. 10 (receiver diode pre-amp and signal processor, and PLL) must have access to all four pulsed signals to determine the synchronisation asymmetry for itself. Each PLL will then be designed to lock only onto one particular pair of start/stop pulses (see FIG. 9). PLL locks sync pulse S(A) generated from received signals beam 1 and beam 3, to sync pulse LIS(A) generated from a local oscillator. Each system has additional logic to compare the phase of its locally generated sync signals LS(A) and LS(B) to give double lock confirmation.

Figure 4:
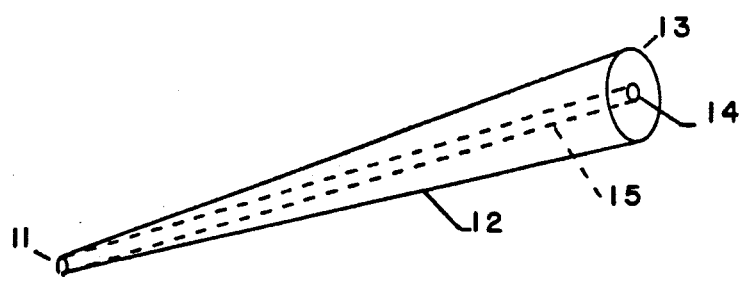
FIG. 4 is a view of one of the beams.
Figure 6:
Figure 7:
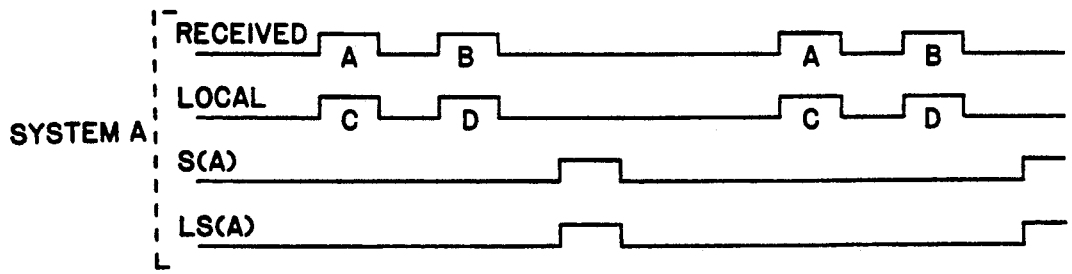

As shown in FIG. 4 each transmitter 11 transmits a diverging beam 12 which produces a notional spot 13 within which the receiver 14 must be located, the beam being aimed so as to achieve this. Because of the divergence of the beam of course this makes the aiming process very much easier. At the same time the relatively small diameter of the receiver 14 and small diameter of beam at the emitter means that the part of the beam which is relevant for speed measurement is only that indicated by the broken lines 15 whose diameter is set by the diameters of the transmitter 11 and receiver 14 and accordingly sufficient accuracy can be assured simply by making this virtual diameter 15 of sufficiently small size, for example 2 mm to 8 mm. While, however, the divergence 12 of the beam makes the aiming much easier it does increase the risk that both receivers will receive both of the signals shown in 4 and 5. Assuming, however, this is the case each receiver will then receive a signal which is a pulsed on/off signal of the kind shown in FIG. 6. These signals are passed through an "OR" gate and therefore combined into the signal as shown. In order to monitor this signal a local signal is generated in the electronic circuitry which mimics the signal shown in FIG. 6. A phase lock loop ensures that the received signal and the local signal remain in perfect phase. The pulses in FIG. 7 which are received are marked A and B respectively and which are locally generated are marked C and D respectively. Then if the beam 1 is broken by an obstruction the pulse A will be missing from the receiver 1 and this will be used to trigger the start of the timing.

The second unique feature is that the phase lock loop is such that when either beam is broken the phase lock loop can retain a lock status that was achieved indefinitely based on the one remaining beam before either beam was broken thus bi-directional measurements are possible with a high degree of confidence.

Each PLL determines lock status of both PLL and thus double interlocking lock status indication is achieved.

The PLL's can each maintain positive synchronisation even with only one of the two beams present. A system of disengaging the control voltage to the VCO enables the VCO to maintain floating synchronisation for about a second after the second beam has been broken. This is sufficient for taking measurements on the trailing edge of the vehicle.

Referring to FIG. 9, the system A PLL locks the sync pulse. S(A) generated from received signals 1 and 3 to Sync pulse S(A) generated from the local oscillator.

Each PLL checks that S(A) and S(B) are in phase to give double lock confirmation.

A third unique feature can be introduced in order to achieve two fully independent and identical systems which can truly be said to be optically separated. This can be done by horizontally polarising one start and stop pair in one plane and its receiver in the same plane and polarising the other start and stop pair at 90° to that plane also with its receivers aligned to that polarisation.

One of the most valid criticisms of optical beam systems in the past has been that the precise trigger point in the vehicle is not reliably determined. For example, if the start beam were triggered on the bumper of the vehicle and for reasons of vehicle vertical oscillation or imperfect set up of the instrument the stop beam misses the bumper and is only triggered on the head light it is clear that an incorrect speed calculation would result. The invention's unique feature overcomes this problem by the use of the dual system described and by placing the beams at different heights and at different locations. In this example the one start and stop beam is located 100 mm above the other and also 100 mm or more off set horizontally.

A fifth unique feature is that a fault detection system can be based on the logical sequence in which the beams are broken. This can be incorporated to preclude the possibility that the vehicle breaks the start beam and another obstruction breaks the stop beam from the other side, the only permissible sequences thus are:

R1, R2, R3, R4-case 1, or

R4, R3, R2, R1-case 2.

In case 1, R1 and R2 are used as start 1 and start 2 signals and R3 and R4 are used as stop 1 and start 2 signals.

In case 2, R4 and R3 are used as start 1 and start 2 signals and R2 and R1 are used as stop 1 and start 2.

The system will maintain phase integrity for 1 to 4 seconds after both beams have been broken thus the trailing edge of the vehicle measurements or validation measurements are possible. The modulation frequency in this example was earlier, 33,3 kilohertz, now 83,33 kilohertz, the pulse width was 5 micro-seconds, now 1 micro-second, and the effective beam diameter, that is the distance it takes to fully break the beam was approximately 6 mm, now 2 mm. The infra-red light used has a spectrum which peaked at 830 nanometers, now 810 nanometers. Apart from the use of an LED a discharge-tube, laser, or laser diode or any similar device can be used for the projection of the beam. An example of divergence of a beam in recent tests is 20 m Sr Rad (a bit over one degree).

Figure 8:
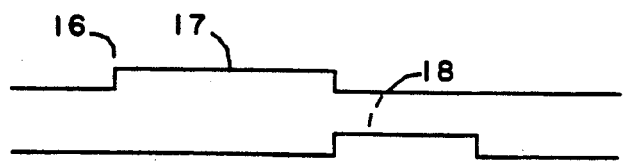

As shown in FIG. 8 a validation system can be initiated at the time 16 at which the first pulse is lost, i.e. where the leading end of the vehicle first interrupts a pulsed light signal. After this a period 17 of 450 micro-seconds, (now 100 micro-seconds) is allowed to ensue, during this period about 15, (now 8) pulses may occur and then follows a 100 micro-second period 18 in which about three pulses, now 8 occur and during which the system will validate that all of those pulses are still missing. Once this validation has been confirmed then the instrument will accept that the first pulse which occurs lost at 16 is in fact a valid initiation point in time for the initiation of a measurement and the measurement will continue. This is intended and can be designed to prevent false triggering from moths and birds and the like.

FIGS. 10 to 14 are self explanatory, FIG. 10 shows a pulse recovery system with the sequence of filtering, auto gain control, peak sample and hold subtractor, comparison with reference voltage and latching to an output pulse, the graphs below illustrate these successive steps.

Figure 11:
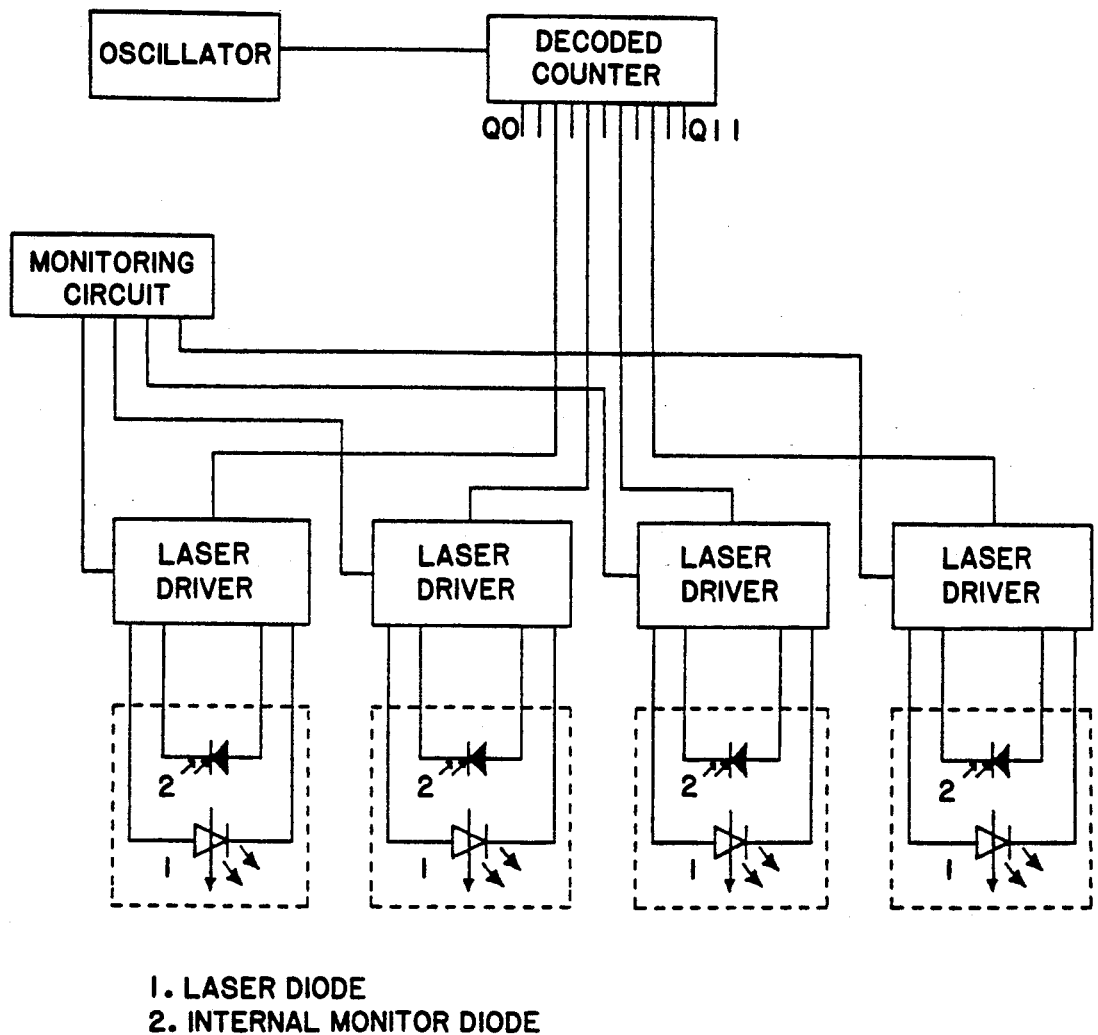

FIG. 11 shows main features of the transmitter circuits including oscillator, decoded counter, monitoring circuit, laser drivers and the laser diodes with internal diodes.

Figure 12:
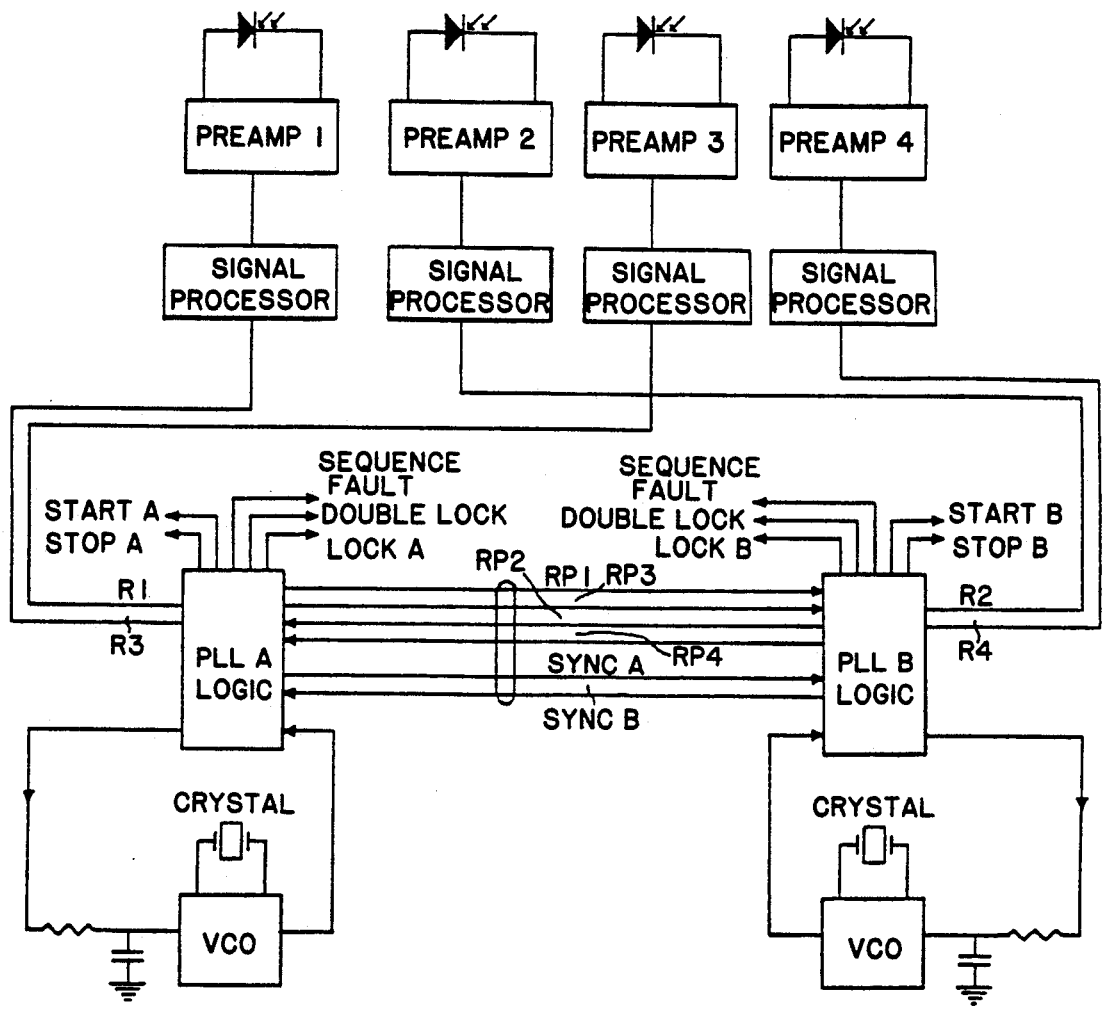

FIG. 12 shows the receiver circuits including photo transistors, preamps, signal processors, the phase lock loop circuitry where shaped received signals are passed between PLL's for mutual lock confirmation.

Figure 13:
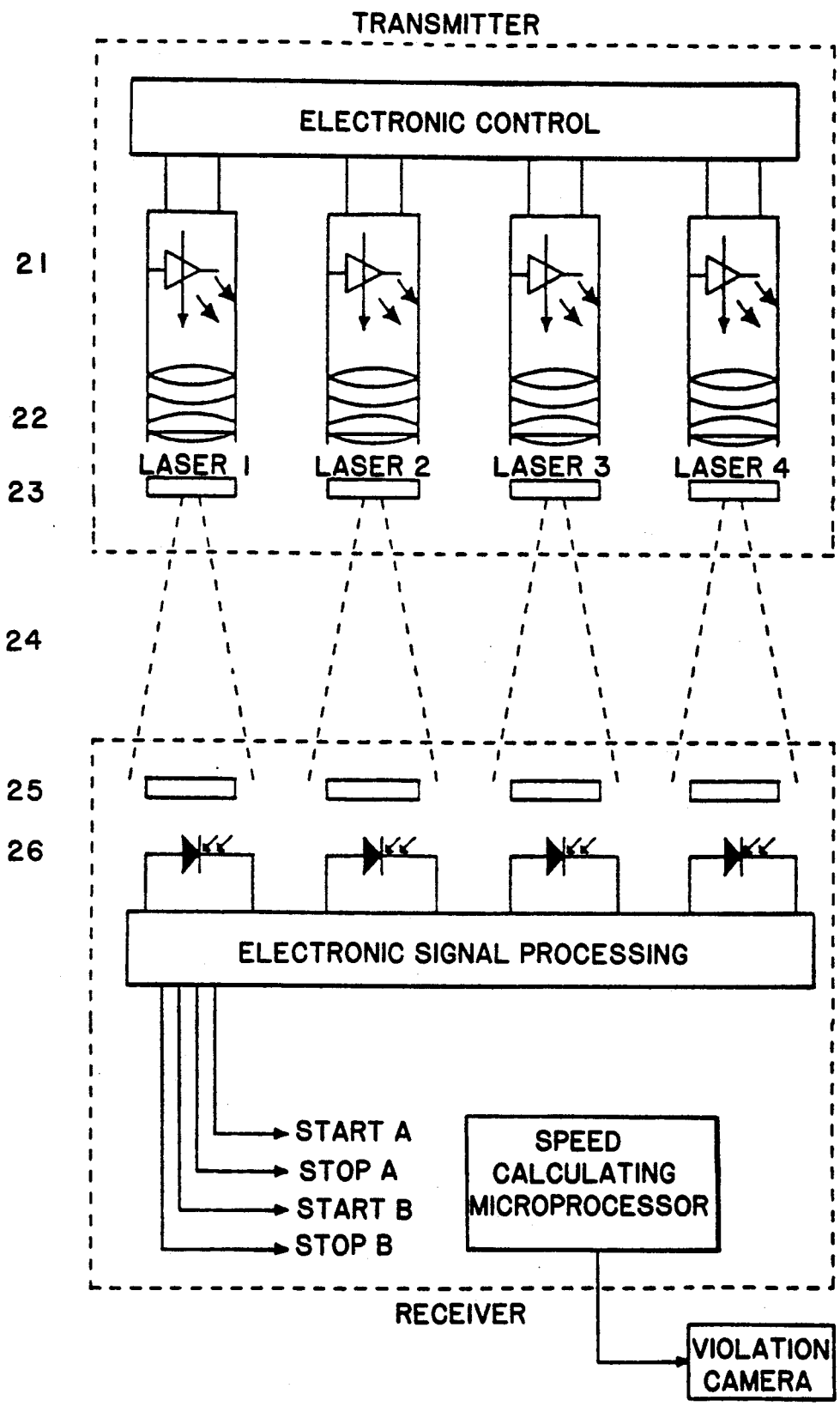

FIG. 13 shows the transmitters and receivers system including laser diodes 21, lens collimators 22, plain glass filters 23, mono chromatic lasers 24, IR filters 25 and receiving diodes 26.

Figure 14:
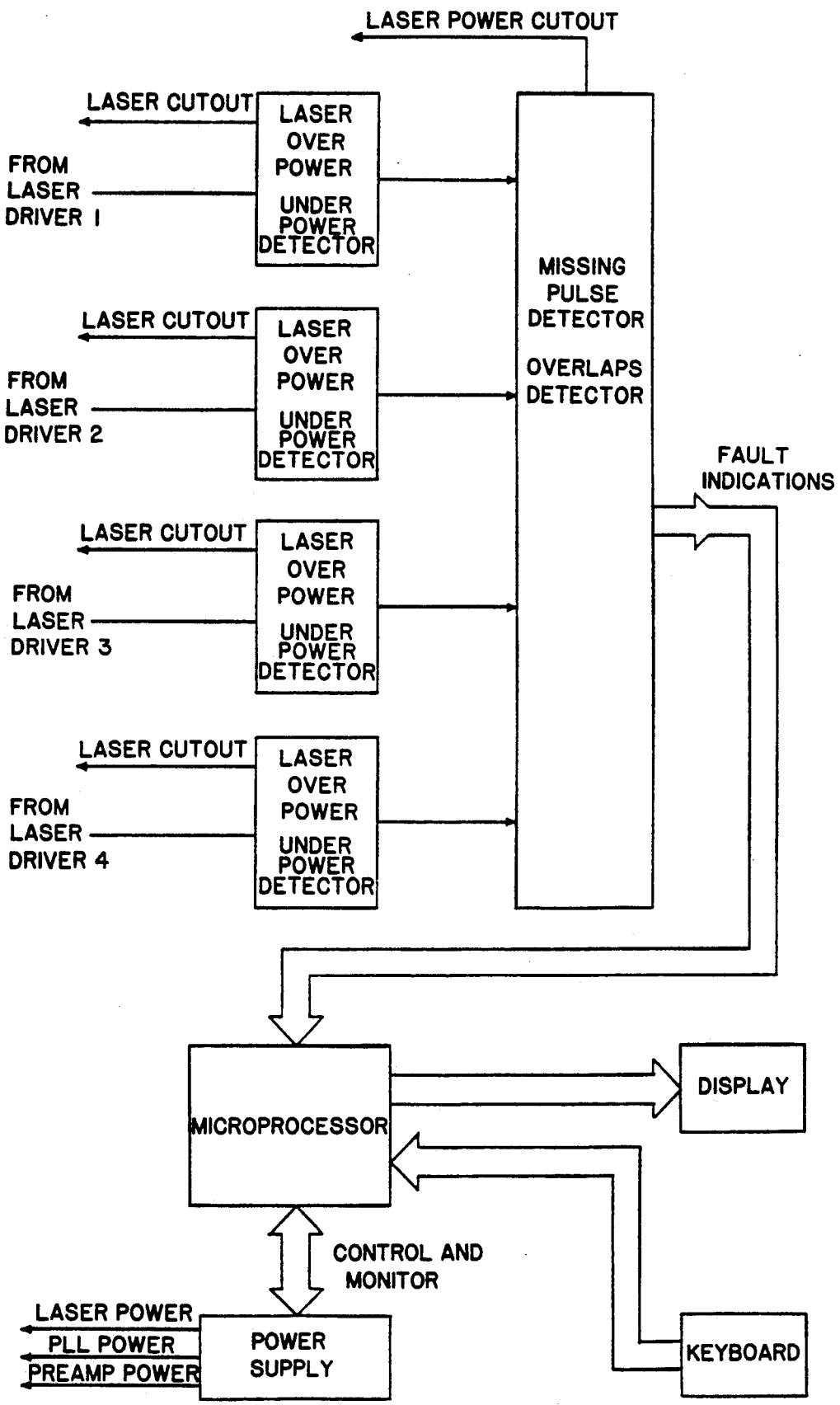

FIG. 14 shows the transmitter monitoring circuit including the laser over- and under-power detectors and laser cutout, missing pulse and overlaps detector, the microprocessor receiving fault indicators giving display, allowing keyboard input and power supply.

We claim:

1. A beam system for monitoring vehicles which comprises
   a) a transmitter for a higher and a lower pair of beams, both beam pairs having a start beam and a stop beam, said start and said stop beams being spaced from each other by a known measuring distance,
   b) a receiver for each beam,
   c) electronic means which detect when reception of one or more of the beams by one of said receivers is interrupted,
   d) means for manipulating data derived from the receivers according to algorithms for monitoring vehicles and,
   e) means for comparing and evaluating vehicle monitoring detections made between said higher and said lower pairs of beams.

2. A system of beams for traffic monitoring as claimed in claim 1, in which said two pairs of beams are further staggered from each other in a horizontal direction by a distance of less than said known measuring distance, together with further means to detect and evaluate the sequence of interruption of the beams.

3. A system of beams for traffic monitoring as claimed in claim 1, in which the beam transmitters are adapted so that the beams are uncollimated but the beam receptors have a restricted diameter or transverse dimension and each of the beams is modulated to give it unique identification detectable only by the correct receptor opposite it.

4. A system of beams for traffic monitoring as claimed in claim 3, in which the beams are modulated by imposing a pulse signature to each beam so that each beam is pulsed in a distinctive manner and so that the detectors can discriminate the correct beam which is projected from opposite the detector from the other beams.

5. A system of beams for traffic monitoring as claimed in claim 3, in which means for checking a correct sequence and timing of interruption of beams, means for generating the modulation of beam each to give it an identification and means for correctly discriminating these beams at the receivers are each selected from the group consisting of suitable electronics, logic circuitry and software.

6. A system of beams for traffic monitoring as claimed in claim 5, in which the means for checking is adapted so that after a first pulse of a modulated beam has been interrupted a waiting period is initiated followed by a validation at the end of the waiting period that the following pulses are still interrupted.

7. A system of beams for traffic monitoring as claimed in claim 1, in which the pulse signals each of which has a particular pulsing signature are discriminated from one another by the use of a phase lock loop in which a signal local to the receptor is generated with the same timing as a transmitted signal and so long as the two signals are in perfect match the beam is received as the correct beam.

8. A system of beams for traffic monitoring as claimed in claim 1, provided with a laser or optical light emitting diode for setting up and aligning of the transmitter and receivers.

9. A system of beams for traffic monitoring as claimed in claim 3, a phase lock loop generated by electronic circuitry which maintains positive synchronization and discrimination between beams for a period of time after the received signal used for lock has been interrupted by a vehicle.

* * * * *